United States Patent [19]
Green

[11] 3,768,570
[45] Oct. 30, 1973

[54] TRACTOR HYDRAULIC LIFT SYSTEM
[75] Inventor: Lawrence R. Green, Warren, Mich.
[73] Assignee: Ford Motor Company, Dearborn, Mich.
[22] Filed: June 28, 1972
[21] Appl. No.: 266,915

[52] U.S. Cl. .................................... 172/9, 172/680
[51] Int. Cl. ......................................... A01b 63/112
[58] Field of Search................................ 172/9, 7, 10

[56] References Cited
UNITED STATES PATENTS
3,194,319 7/1965 Faure...................................... 172/9
3,002,571 10/1961 Kersey et al. ........................... 172/9
3,003,568 10/1961 Merritt et al. .......................... 172/9

Primary Examiner—Robert E. Pulfrey
Assistant Examiner—Stephen C. Pellegrino
Attorney—Kieth L. Zerschling et al.

[57] ABSTRACT

A tractor hydraulic lift control system is provided with a manually adjusted quadrant lever for determining the draft at which the tractor is to operate and a second manually adjusted quadrant lever for determining the implement height. The draft control may raise the implement above the height determined by the position control but may not lower it below the height determined by position control.

3 Claims, 4 Drawing Figures

TRACTOR HYDRAULIC LIFT SYSTEM

This invention relates to agricultural and general purpose tractors having a power-liftable implement hitch, and more particularly to a control system for controlling the height of the tractor hitch in response to implement draft (draft control) or alternatively to maintain the implement at a preselected position despite normal leakdown, etc., (position control).

The system of the present invention utilizes two quadrant levers for control of the implement hitch by the tractor operator, one lever for draft control and one for position control. The position control quadrant lever may be set to establish an implement height below which the implement will not move regardless of fluctuations in implement draft. In some respects this invention is an improvement over U.S. Pat. No. 2,996,144.

Among the objects of the present invention are to provide a tractor hydraulic lift control system in which the implement-supporting hitch is raised and lowered to maintain a generally uniform draft on the tractor while at the same time the hitch is prevented from going below a preselected depth regardless of operating draft; to provide an improved tractor hydraulic lift system of the two-control lever type and generally to improve hydraulic lift control systems of the type described.

Other objects, and objects relating to details of construction and operation will be more apparent from the detailed description to follow.

My invention is clearly defined in the appended claim. In the claim, as well as in the description, parts may at times be identified by specific names for clarity and convenience, but such nomenclature is to be understood as having the broadest meaning consistent with the context and with the concept of my invention as distinguished from the pertinent prior art.

The best form in which I have contemplated applying my invention is illustrated in the accompanying drawings forming a part of this specification in which.

Figure 1:
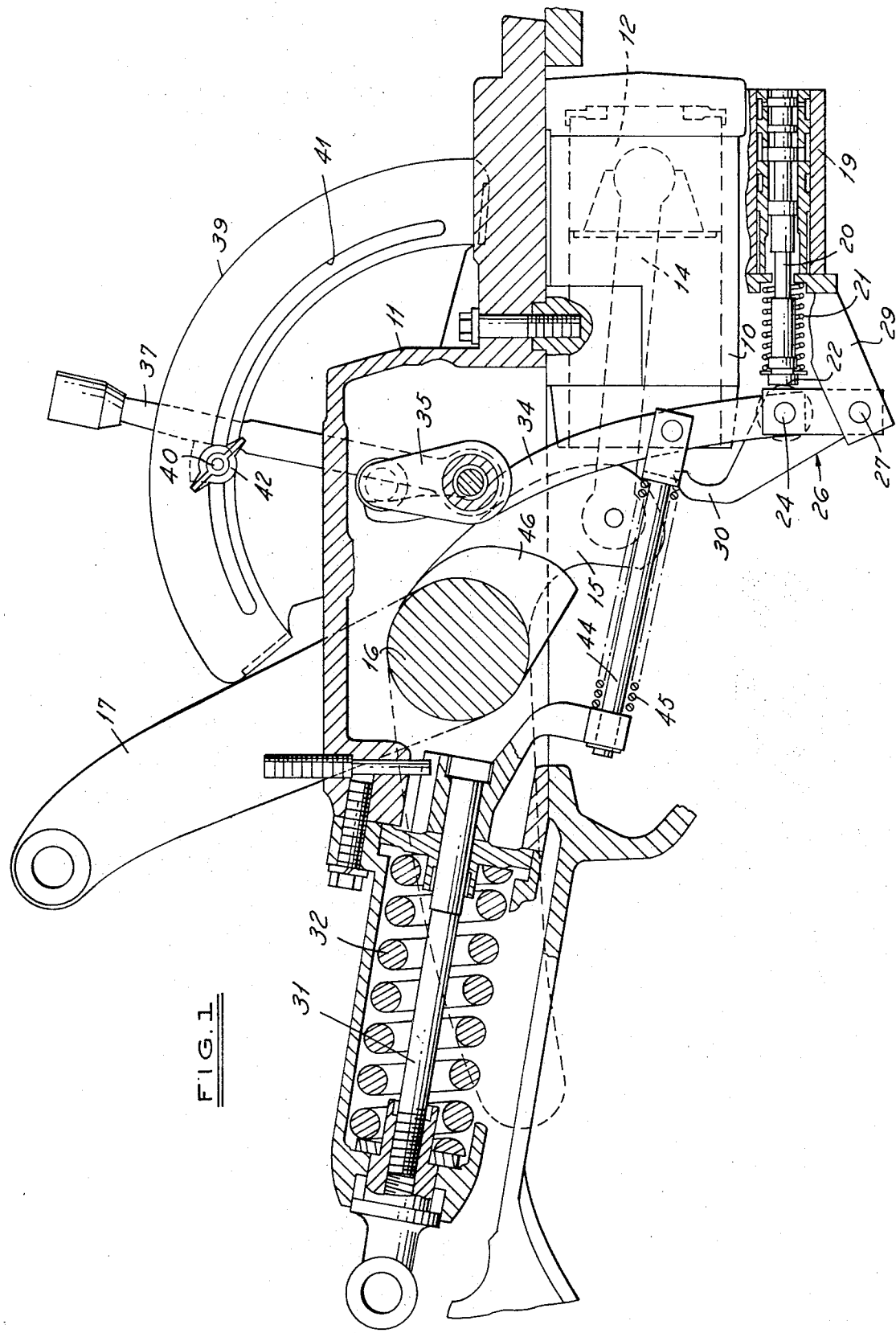
FIG. 1 is a vertical longitudinal section taken through the lift cover and showing the draft control mechanism and associated parts for controlling height of the hitch.

The tractor with which the present invention is intended to be used is the well known Ford tractor in which an implement mounting hitch carried on the tractor is raised or lowered by a mechanism including a hydraulic cylinder 10 which is mounted on the underside of a lift cover 11 which forms a part of the center housing of the tractor. The cylinder 10 is of the single acting type having a piston 12 and a connecting rod 14 which operates a ram arm 15. The ram arm 15 is secured to a rock shaft 16 journalled in the lift cover 11. A lift arm 17 secured to each end of the rock shaft 16 outside of the lift cover is linked to the lower links of the hitch in a well known manner to lift the hitch upon actuation of the cylinder 10.

A valve 19, which is of the spool valve type, serves to control admission of hydraulic fluid under pressure from a hydraulic pump (not shown) to the cylinder 10 and release of fluid from the cylinder 10. Admission of fluid to the cylinder serves to raise the hitch and attached implement while release of fluid from the cylinder serves to permit the hitch to drop under force of gravity, thus lowering the implement.

Movement of the spool 20 of valve 19 to the right as viewed in FIG. 1 serves to admit fluid to the cylinder 10 so as to raise the hitch while movement of the spool to the left as viewed in that figure serves to lower the hitch by releasing fluid from the cylinder. One end of the spool 20 projects from the valve 19 and has a spring 21 which biases the spool into hitch-lowering position. There is a neutral position of the spool 20 in between the raising and lowering positions at which no fluid is admitted to the cylinder 10 and no fluid is released so as to hold the hitch at a constant elevation with respect to the tractor.

The valve spool 20 is operated by engagement of a roller 22 with the end of the spool. The roller 22 is mounted for rotation upon a pivot shaft 24 carried by a pair of levers 25 and 26 which are journalled on a fixed pivot 27 supported by an arm 29 mounted on the body of valve 19.

In order to cut off the flow of fluid to the cylinder 10 when the hitch has raised to top of lift, the lever 26 has an extended portion 30 overlying the path of the piston 12 at the open end of cylinder 10. At top of lift, the skirt of piston 12 exits from the end of cylinder 10 and engages the extended portion 30 so as to restore the valve spool 20 to neutral position, thus cutting off flow of fluid to the cylinder 10.

In the tractor of the present invention, draft from the hitch is sensed from the top link (not shown) of the hitch. The top link is connected in a well known manner to a draft plunger 31 projecting from the rear of the lift cover 11. A draft spring 32 encircles the draft plunger, draft reaction on the top link moving the draft plunger longitudinally in the lift cover and more or less compressing the draft spring 32.

A draft control servo lever 34 is pivotally mounted on the pivot 24 mounting the roller 22 and projects upwardly as indicated in the drawings. The top of this lever is positioned by a crank 35 which is fixed to a hollow shaft 36 extending through the lift cover 11. A draft control quadrant lever 37 is fixed to the end of shaft 36 outside of the lift cover. Movement of the quadrant lever 37 serves to select the draft at which the tractor is to operate. Movement of the lever 37 counterclockwise as viewed in FIG. 1 serves to move the top of lever 34 rearwardly so as to cause the tractor to operate at a lighter draft, while movement of the quadrant lever 37 in a clockwise direction serves to increase the draft at which the tractor is to operate. The range of movement of the draft control quadrant lever 37 is such that the system can be set to operate at a greater draft than that represented by maximum inward movement of the draft plunger 31 so as to permit operation of the system, if desired, at very high draft without lifting the implement. A quadrant 39 mounted on the lift cover 11 extends along the path of the quadrant lever 37. If desired, a stop 40 may be secured in any selected position along a slot 41 in the quadrant 39 to aid in readily restoring the quadrant lever to a selected position. A thumb screw 42 serves to secure the stop in any position along the slot 41.

The draft plunger 31 is connected with the midportion of the draft control servo lever 34 so as to move this portion of the lever responsive to changes in draft. The connection is by a telescoping link 44 which is held in extended position by a draft override spring 45 surrounding the link. The arrangement is such that the telescoping link 44 is normally in extended position but upon rapid increase in draft load and sudden movement of the draft control plunger 31, the link 44 may telescope slightly, compressing the spring 45 and avoiding bending of the valve operating linkage. This arrangement also permits function of lever 26 to cut off flow of fluid to the cylinder 10 at top of lift, the link 44 being compressed slightly by movement of the lever 26 caused by the piston 12. It will be noted that for each position of the top portion of the servo lever 34 which in turn is controlled by the position of the draft control quadrant lever 37, there will be a predetermined amount of compression of the draft spring 32 in order to position the valve spool 20 in neutral position at which the hitch is neither raised nor lowered. Upon the draft decreasing from this predetermined amount the draft plunger will move to the left as viewed in FIG. 1 so as to move the lower end of the servo lever 34 about its top as the center and cause the valve spool 20 to move in a direction to release fluid from the cylinder 10 and thus cause the hitch to lower and increase the draft to the predetermined amount for which the quadrant lever 37 has been set.

On the other hand, if the draft increases to an amount in excess of that preselected by the draft control quadrant lever 37, the draft spring will be additionally compressed, thus moving the mid-portion of the lever to the right about its upper end as the center, so as to move the valve spool 20 in the direction to admit hydraulic fluid to the cylinder 10 and thus lift the hitch and restore the draft to the preselected amount.

The tractor of the present invention also has position control of the hitch. The position of the tractor hitch is sensed and the control mechanism actuated by a position control cam 46 mounted on the rock shaft 16 which actuates a position control servo lever 47, the lower end of which is pivotally mounted on the pivot shaft 24. The upper end of the position control servo lever 47 is positioned by a crank 49 mounted on a position control quadrant lever shaft 50 which is concentric with and mounted inside of the draft control shaft 36. A position control quadrant lever 51 is mounted on the outer end of the shaft 50 and moves along the quadrant 39. Moving the position control quadrant lever 51 forwardly and downwardly (clockwise as viewed in FIG. 2) serves to lower the tractor hitch while moving it upwardly and rearwardly serves to lift the hitch.

A pair of levers 52 and 54 are mounted on the inner end of the draft control shaft 36 and are interconnected by a torsion spring 55 surrounding that shaft. A screw 56 projecting from the lever 52 and received within an arcuate slot 52 in the lever 54 limits the torsional movement to that shown in FIG. 2 in which the levers extend from the draft control shaft at an angle of about 60°. The lever 54 is engaged by the position control cam 46 and the lever 52 engages a pad 57 on an intermediate portion of the position control servo lever 47.

Figure 2:
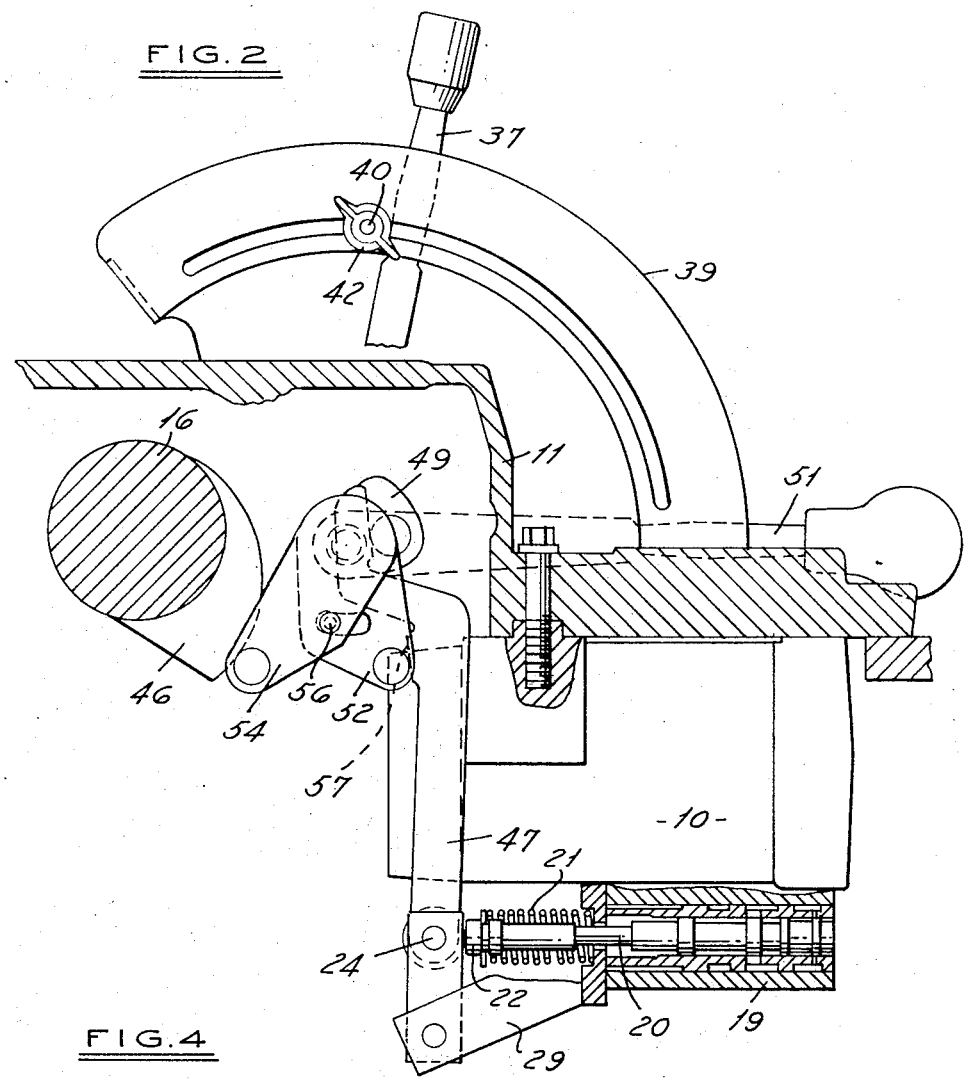
FIG. 2 is a vertical longitudinal section taken through the lift cover and showing the position control mechanism and associated parts for controlling height of the hitch.
Figure 4:
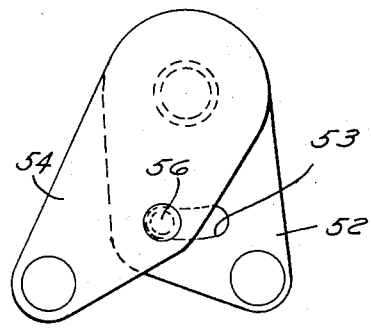
FIG. 4 is an enlarged elevation of the levers for transmitting motion from the position control cam to the valve-operating position control servo lever.
Figure 3:
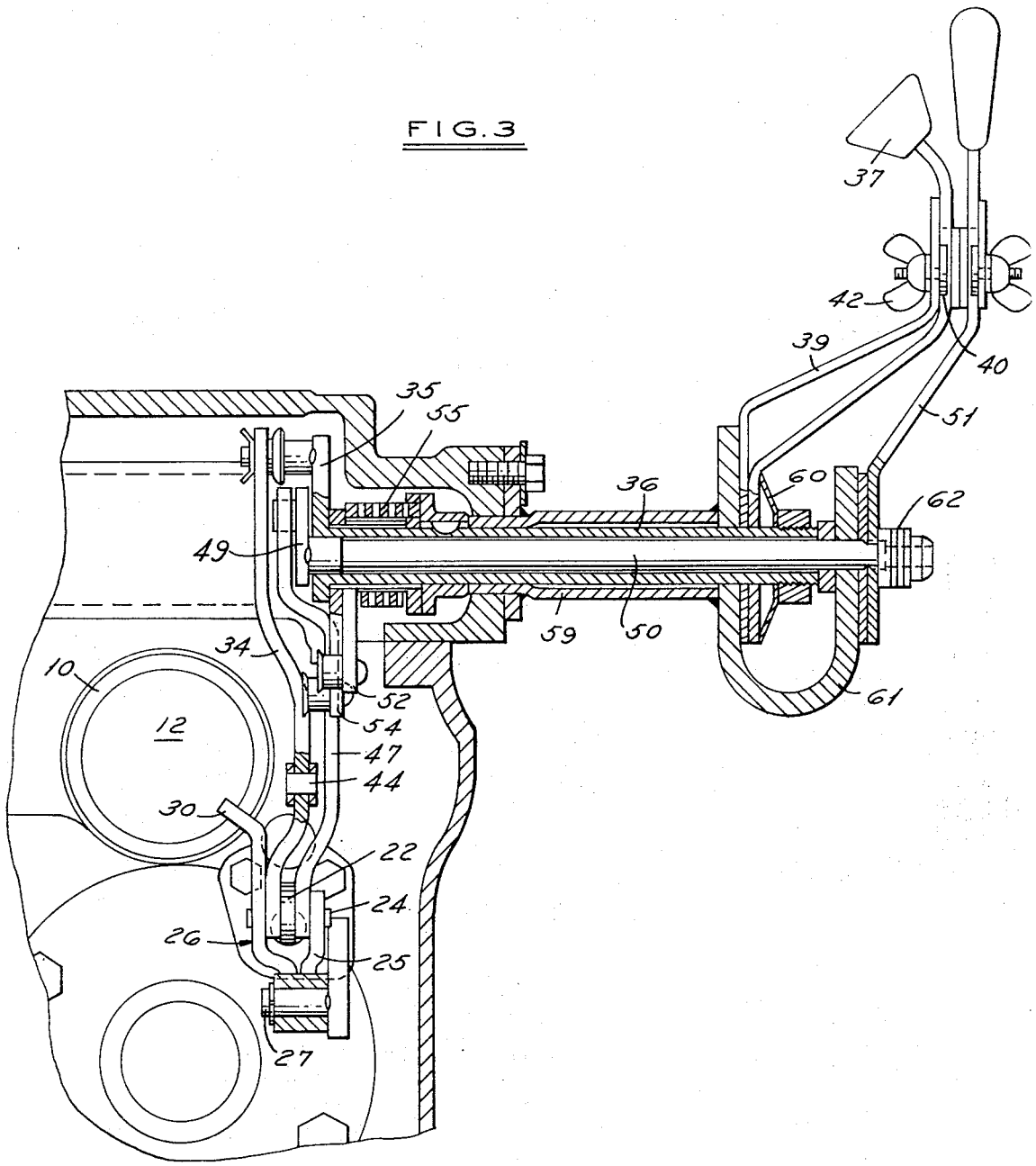
FIG. 3 is a transverse vertical section taken through the upper portion of the center housing and the lift cover and showing the draft control and position control mechanism for controlling height of the hitch.

As the quadrant lever 51 is moved to selected position, the crank 49 connected with the shaft 50 will rock the top of the servo lever forwardly or rearwardly, as viewed in FIG. 2, tending to pivot the lever about its engagement with the lever 52 which is positioned by the position control cam 46. This results in movement of the lower end of servo lever 47 so as to operate the valve 19 and raise or lower the hitch. The torsion spring 55 serves the same purpose as the draft control override spring 45 in protecting the position control linkage from damage should the position control quadrant lever 51 be moved beyond the limit of movement of the valve spool 20.

The above-described control mechanism is such that the tractor hitch will not fall below the level established by position of the position control quadrant lever 51. Accordingly, to operate in draft control, the position control lever may be pushed to its lowest position on the quadrant 39, thereby allowing linkage lowering to its full limit and the draft control quadrant lever 37 positioned for the desired operating draft. If it is desired to operate an implement at a height limited to less than full lowered position of the hitch, the position control quadrant lever 51 may be positioned partly down the quadrant 39 and the draft control quadrant lever 37 positioned for operation at the desired tractor draft. Upon the draft exceeding that for which the draft control lever has been set, the valve 19 will be operated and the hitch lifted to maintain the predetermined draft. If, however, the draft decreases in an amount sufficient to cause the valve 19 to lower the hitch to a position lower than that established by the position control quadrant lever 51, position control will take precedence and the upper end of the draft control servo lever 34 will move away from the crank 35 which normally positions the upper end of this servo lever.

The draft control quadrant lever shaft 36 and position control quadrant lever shaft 50 are supported by a tube 59 projecting from the side of the lift cover 11 and the quadrant 39 is supported on the outer end of this tube. The draft control quadrant lever 37 is urged against the quadrant by a resilient pronged spring 60 to hold it in adjusted position. Similarly, the position control quadrant lever 51 is urged against an extruded portion 61 of the quadrant by a wavy washer 62.

I claim:

1. In a tractor having an implement supporting hitch, a hydraulic cylinder for supporting the hitch at different elevations, a source of fluid under pressure, a control valve for admitting fluid to or releasing fluid from the cylinder, draft control means for controlling operation of the control valve responsive to implement draft, position control means for controlling operation of the valve responsive to height of the implement supporting hitch, the position control means including a servo lever operated responsive to height of the hitch, the draft control means including a second servo lever operated responsive to implement draft, the two servo levers each being mounted adjacent one end thereof on a common pivot adjacent the control valve, a lever mounted for rotation about a fixed center and supporting the pivot for movement in a direction to cause the lever to engage and operate the control valve, whereby the servo levers are supported and either servo lever may operate the valve, the implement draft control means serving to lift the hitch above the level established by the position control means as required to maintain preselected implement draft but being inoperative to lower the hitch below the level established by the position control means.

2. In a tractor as claimed in claim 1, the other ends of the servo levers each being positioned by a manually adjusted quadrant lever through a linkage making sliding contact with said other ends of the servo levers.

3. In a tractor as claimed in claim 2, the draft control servo lever having a one-way connection with the linkage associated with its quadrant lever to permit said servo lever to become disengaged from said linkage, whereby the hitch height is limited by the position control mechanism.

* * * * *